United States Patent
Metzger et al.

(10) Patent No.: US 7,142,965 B2
(45) Date of Patent: Nov. 28, 2006

(54) METHOD FOR OBTAINING TRIGGERING SIGNALS FOR PASSIVE SAFETY DEVICES OF A MOTOR VEHICLE FROM DATA OF A VEHICLE DYNAMICS CONTROL SYSTEM

(75) Inventors: Marco Metzger, Ludwigsburg (DE); Remco Ten Zweege, Stuttgart (DE); Ralf-Peter Jaime, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 10/896,095

(22) Filed: Jul. 20, 2004

(65) Prior Publication Data
US 2005/0021206 A1 Jan. 27, 2005

(30) Foreign Application Priority Data
Jul. 22, 2003 (DE) .............................. 103 33 169

(51) Int. Cl.
*B60R 22/00* (2006.01)

(52) U.S. Cl. ........................................................ 701/45

(58) Field of Classification Search .................. 701/45, 701/40, 77; 280/757, 802
See application file for complete search history.

(56) References Cited

U.S. PATENT DOCUMENTS 6,804,595 B1 * 10/2004 Quail et al. .................... 701/45
2004/0195030 A1 * 10/2004 Eberle et al. ............... 180/271

FOREIGN PATENT DOCUMENTS

DE 101 21 386 8/2002
DE WO02/087926 * 11/2002

* cited by examiner

*Primary Examiner*—Thu V. Nguyen
(74) *Attorney, Agent, or Firm*—Kenyon & Kenyon LLP

(57) ABSTRACT

A method for generating triggering signals for passive safety devices of a motor vehicle. According to the method, from sensor signals, it is ascertained whether either an oversteering driving condition or an understeering driving condition exists and at least one triggering signal for a passive safety device is generated as a function of the ascertained driving condition. The at least one triggering signal is ascertained from the sensor signals by a method based on fuzzy logic.

7 Claims, 2 Drawing Sheets

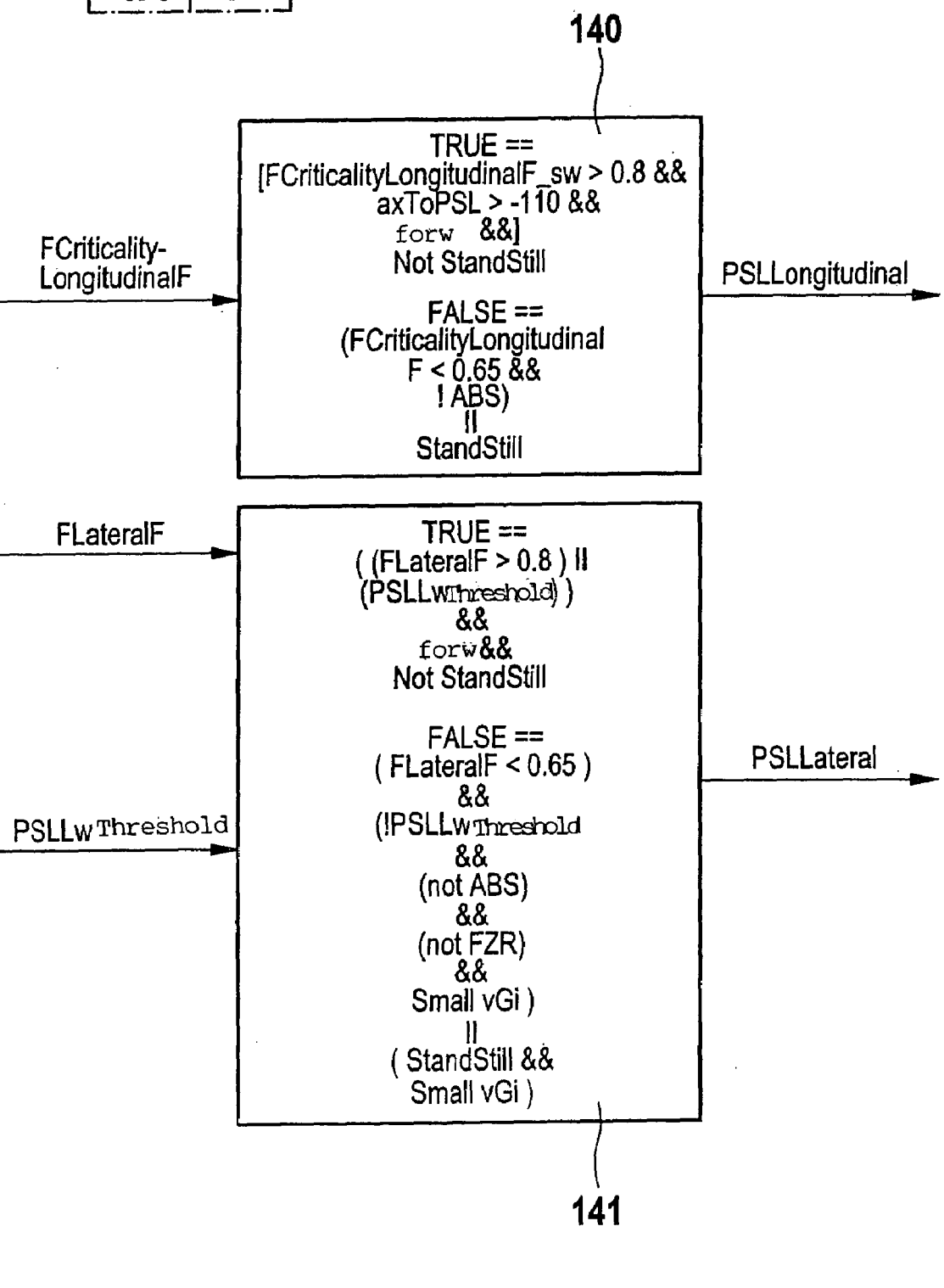

METHOD FOR OBTAINING TRIGGERING SIGNALS FOR PASSIVE SAFETY DEVICES OF A MOTOR VEHICLE FROM DATA OF A VEHICLE DYNAMICS CONTROL SYSTEM

BACKGROUND INFORMATION

In vehicle engineering, various conventional systems reduce the risk of injury to vehicle passengers during an accident. For example,
- the closing of side windows,
- the closing of the sunroof,
- straightening of the seat or
- tightening of the seat belts.

With the last two measures named, the driver is maneuvered into an upright position to thereby reduce the intensity of head movements. However, the tightening of the seat belt no longer makes sense if the driver has already been thrown too far forward due to an accident. For optimal functioning of the seat-belt tightener, the system must react with appropriate speed. The system must not be activated too quickly, however, since any activation of the seat-belt tightener means a loss of comfort. After the critical phase has ended, a loosen signal is sent to the seat-belt tightener.

German Patent Application No. DE 101 21 386 describes a method for triggering a reversible passenger protection means in a motor vehicle having a driving-condition sensor system. The reversible passenger protection means can be triggered prior to the moment of collision and thereby be brought into active setting. To that end, the driving-condition data are monitored with respect to an emergency-braking state, and the passenger protection system is triggered in response to ascertainment of the emergency-braking state. In addition, an understeering state and an oversteering state are ascertained by the data-processing device. The reversible passenger protection system is triggered when the emergency-braking state and/or the oversteering state and/or the understeering state is detected by the data-processing device.

SUMMARY

The present invention relates to a method for generating triggering signals for passive safety devices of a motor vehicle, in which
- from signals and/or sensor signals, it is ascertained whether either an oversteering driving condition or an understeering driving condition exists and
- at least one triggering signal for a passive safety device is generated as a function of the ascertained driving condition.

In accordance with the present invention,
- the at least one triggering signal is ascertained from the signals and/or sensor signals by a method based on fuzzy logic.

The use of fuzzy logic permits generation of triggering signals that is more robust and reliable.

An advantageous refinement of the present invention is characterized in that
- from the sensor signals, it is determined whether a particularly strong or particularly quick driver's braking input is present,
- a first triggering signal characterizing the dangerousness of the present driving condition from the standpoint of longitudinal dynamics is generated as a function of the ascertained driver's braking input using a method based on fuzzy logic, and
- a second triggering signal characterizing the dangerousness of the present driving condition from the standpoint of lateral dynamics is generated depending on whether an oversteering driving condition or an understeering driving condition exists.

It is thereby possible to trigger the respective safety devices in an individually adapted manner, i.e., depending upon the dangerousness from the standpoint of lateral dynamics or longitudinal dynamics.

One advantageous embodiment of the present invention is characterized in that both triggering signals are binary signals
- which include whether or not a driving condition is dangerous,
- but which contain no information about the degree of dangerousness.

The binary signals are suitable in a particularly simple manner for further processing in control units. Here, it should be stressed that the generated signals do not necessarily have to be binary signals.

One advantageous refinement of the present invention is characterized in that
- the triggering signal indicating the dangerousness of the existing driving condition from the standpoint of lateral dynamics is obtained by defuzzification.

The defuzzification is an inverse transformation from the fuzzy region. The defuzzification is particularly well-suited to introduce further conditions such as movement direction of the vehicle or the state of various vehicle controllers (ABS, ESP, . . . ) into the ascertainment of the triggering signal.

One advantageous refinement of the present invention is characterized in that
- at least one variable which, in the case of an oversteering driving condition, is a measure for the intensity of the oversteering and
- at least one variable which indicates whether or not an understeering is present are used in the defuzzification.

Since an understeering state is less critical from the standpoint of driving dynamics than an oversteering state, it is not necessary to ascertain its intensity.

One advantageous embodiment of the present invention is characterized in that, to ascertain the dangerousness from the standpoint of lateral dynamics,
- a fuzzy deviation variable is ascertained by fuzzification of a variable describing the deviation of the actual vehicle handling from the setpoint vehicle handling,
- a fuzzy steering-angle variable is ascertained by fuzzification of the steering angle,
- the triggering signal characterizing the dangerousness of the existing driving condition from the standpoint of lateral dynamics is ascertained at least from the fuzzy steering-angle variable and the fuzzy deviation variable by defuzzification.

This procedure permits particularly simple detection of understeering or oversteering.

One advantageous refinement of the present invention is characterized in that
- the triggering signal indicating the dangerousness of the existing driving condition from the standpoint of longitudinal dynamics is obtained by defuzzification.

One advantageous embodiment of the present invention is characterized in that
- a fuzzy braking-force variable is determined by fuzzification of a variable describing the intensity of the brake-pedal actuation and/or a fuzzy braking-speed variable is ascertained by fuzzification of a variable describing the speed of the brake-pedal actuation, a fuzzy longitudinal-dynamics variable characterizing the dangerousness of the existing driving condition from the standpoint of longitudinal dynamics is ascertained from at least the fuzzy braking-force variable and/or the fuzzy braking-speed variable, and the triggering signal indicating the dangerousness of the existing driving condition from the standpoint of longitudinal dynamics is obtained by defuzzification of the fuzzy longitudinal-dynamics variable.

In this manner, it is taken into account that a driving situation dangerous from the standpoint of longitudinal dynamics can be characterized both by strong and by rapid braking. Naturally, instead of the braking force, the braking torque may also be considered.

One advantageous development of the present invention is characterized in that, as a function of the at least one triggering signal the closing of the vehicle sunroof is initiated, and/or
the closing of the vehicle side windows is initiated, and/or
the driver's seat is brought into a predetermined position and/or
at least one seat-belt tightener is activated.

Driver safety is thereby increased in critical situations.

The device of the present invention for generating triggering signals for passive safety devices of a motor vehicle may include driving-condition detection means, in which from signals and/or sensor signals, it is ascertained whether either an oversteering driving condition or an understeering driving condition exists, as well as triggering-signal ascertainment means, in which at least one triggering signal for a passive safety device is generated as a function of the ascertained driving condition.

The device is characterized in that the triggering-signal ascertainment means are configured so that the at least one triggering signal is ascertained from the signals and/or sensor signals by a method based on fuzzy logic.

The advantageous embodiments of the device according to the present invention also translate into advantageous embodiments of the method according to the present invention, and vice versa.

BRIEF DESCRIPTION OF THE DRAWINGS

An exemplary embodiment of the present invention is shown in FIG. 1A and FIG. 1B. FIG. 1A and FIG. 1B show the basic sequence of an example method according to the present invention.

EXAMPLE EMBODIMENTS

Figure 1A:
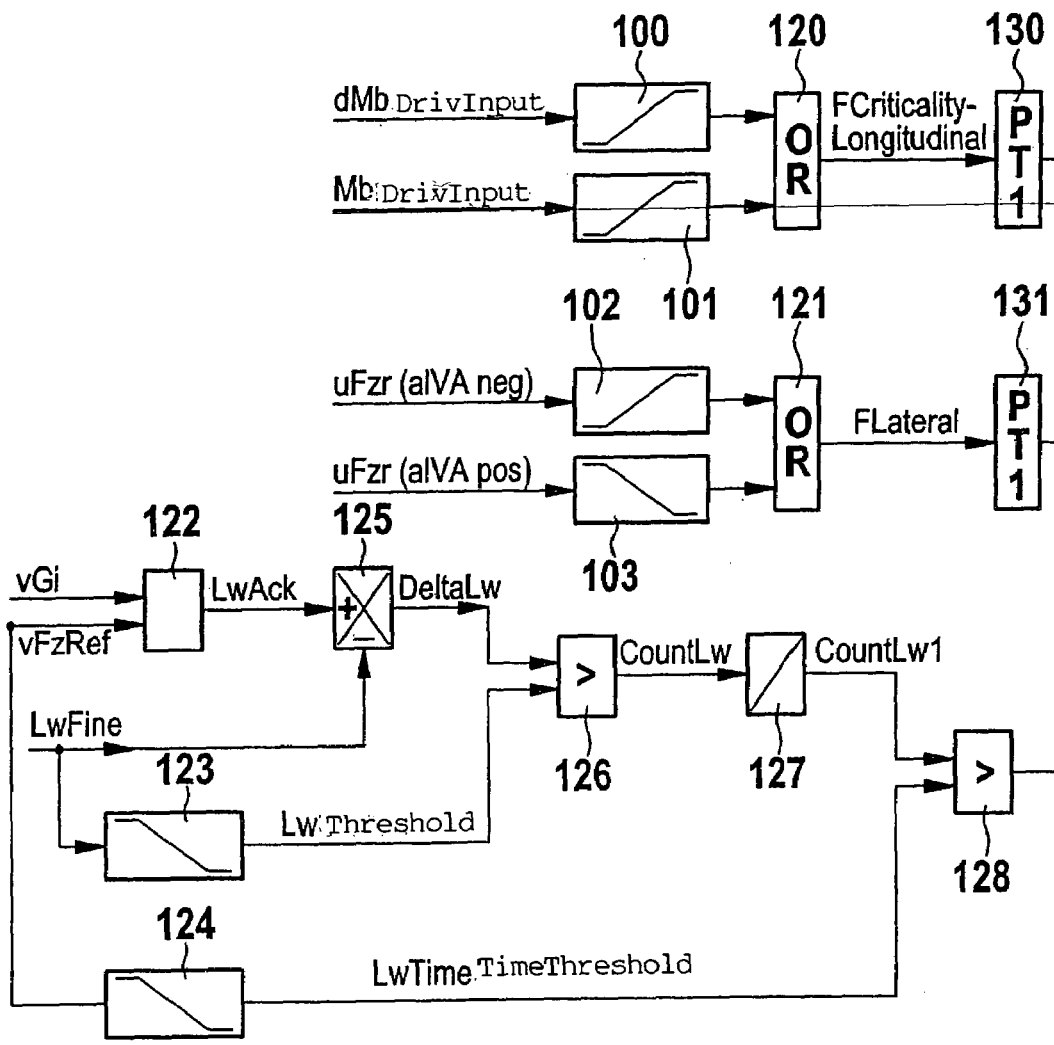

Two signals PSLLongitudinal and PSLLateral are generated by the example method and the example device of the present invention. In the exemplary embodiment, these signals may each assume the values 0 or 1. The meanings in this context are:

PSLLongitudinal=0: No dangerous vehicle situation exists from the standpoint of longitudinal dynamics.
PSLLongitudinal=1: A dangerous vehicle situation exists from the standpoint of longitudinal dynamics.
PSLLateral=0: No dangerous vehicle situation exists from the standpoint of lateral dynamics.
PSLLateral=1: A dangerous vehicle situation exists from the standpoint of lateral dynamics.

These output signals, generated according to the present invention, may be forwarded to safety systems of the vehicle.

In FIG. 1A, which shows the basic design of the example device according to the present invention, these two output signals are illustrated to the right.

On the left side, 6 input signals are shown which, for example, are also needed in a vehicle dynamics control system.

The meanings in this context are:

MbDrivInput: braking torque demanded by the driver via the brake pedal.

dMbDrivInput: Rate of rise of the braking torque demanded by the driver via the brake pedal, i.e. the change in the demanded braking torque per unit of time.

uFzr represents a measure of how strongly the actual lateral-dynamic behavior of the vehicle deviates from the setpoint lateral-dynamic behavior. In particular, this may be the deviation between the actual and the setpoint yaw rate. alVa represents the ascertained slip angle of the front wheels. In this context, it must be decided whether the slip angle is positive (denoted as "alVApos") or negative (denoted as "alVAneg").

LwFine represents the steering angle ascertained, for example, by a steering-angle sensor.

vGi represents the actual yaw rate measured by a sensor.

vFzRef represents the longitudinal vehicular speed (vFzRef).

Variables dMbDrivInput and MbDrivInput are fed to blocks 100 and 101, in which they are fuzzified. In block 120, an OR operation (more precisely: a fuzzy OR operation) of these two fuzzified signals is subsequently carried out. A variable FcriticalityLongitudinal is thereby ascertained, whose value is an indicator that either the variable MbDrivInput is critical ("driver depresses the brake pedal hard") or the variable dMbDrivInput is critical ("driver actuates brake pedal very rapidly"). This variable FcriticalityLongitudinal is also filtered in block 130 to get out the high-frequency components. In the exemplary embodiment, this is a PT1 low-pass filter.

The longitudinal defuzzification is subsequently carried out in block 140. The variable PSLLongitudinal, which may assume the values 0 or 1, is yielded at the output of block 140. The defuzzification specifications are indicated in block 140. The meanings in this context are:

FcriticalityLongitudinalF$_{13}$ sw: filtered fuzzy value, which represents the criticality in the longitudinal direction axToPSL: longitudinal deceleration of the vehicle forw: forw=1 denotes a detected forward movement of the vehicle Not standstill: The vehicle is not at a standstill, i.e. the vehicle wheels are moving.

With respect to the dangerousness of the instantaneous driving condition from the standpoint of lateral dynamics, it is checked whether and how strongly the vehicle is understeering or oversteering.

The check with respect to the oversteering is carried out based on the input signals of blocks 102 and 103; the check with respect to the understeering is carried out based on the input signals of blocks 122, 123, 124 and 125.

As a function of the operational sign of the slip angle of the front axle alVA, a fuzzification of the variable uFzr is carried out in block 102 (if the slip angle is negative) or in block 103 (if the slip angle is positive). A distinction between the presence of a left-hand curve and a right-hand curve is made based on the operational sign of the slip angle. In block 121, the output signals of blocks 102 and 103 are subsequently combined (gated) with OR (more precisely: with a fuzzy OR operation), thereby yielding the signal Flateral. A filtering (preferably a PT1 filtering) takes place again in block 131, thereby yielding the signal FlateralF.

In block 122, the so-called Ackermann steering angle LwAck is determined from yaw rate vGi and longitudinal vehicular speed vFzRef using a single-track model. In block 125, difference DeltaLw is formed between Ackermann steering angle LwAck and measured steering angle LwFine.

This difference DeltaLw is compared in block 126 to a threshold value LwThreshold. In this context, threshold value LwThreshold is ascertained in block 123 from steering angle LwFine, that is to say, it is a steering-angle-dependent threshold value.

If it is determined in block 126 that DeltaLw is greater than LwThreshold, then variable CountLw is set to a predetermined value (e.g. 1). In block 127, the length CountLw1 of that time interval during which DeltaLw exceeds value LwThreshold is subsequently ascertained; that is to say, block 127 is an integrator.

In block 124, a threshold value LwTimeThreshold is ascertained as a function of longitudinal vehicular speed vFzRef. In block 128, it is subsequently checked whether time interval CountLw1 is longer than threshold value LwThreshold. If this is the case, then PSLLwThreshold=1 is set.

PSLLwThreshold can assume two values:
PSLLwThreshold=0: vehicle is not understeering
PSLLwThreshold=1: vehicle is understeering.

To detect the understeering, the difference between the steering angle, measured by a steering-angle sensor, and the Ackermann steering angle (also known as yaw-velocity steering angle) estimated from the yaw velocity is evaluated.

In block 141, variable PSLLateral is generated from variables FlateralF and LwThreshold by defuzzification. The logic operations are marked in in block 141. The meanings in this context are:
PSLLwThreshold: understeering flag
not ABS: anti-lock braking system not active
not FZR: vehicle dynamics control not active
Small vGi: yaw rate small If FlateralF is large or if PSLLwThreshold=1, as well as the vehicle is moving forward and not at standstill, PSLLateral assumes the value 1.

PSLLateral is set back to the value 0 when FlateralF is small and PSLLwThreshold=0, as well as neither the anti-lock braking system nor the vehicle dynamics control system is active. In addition, the yaw velocity only assumes small values.

Moreover, PSSLateral is set back to the value 0 when the vehicle is at a detected standstill and the yaw-rate sensor measures only a small yaw rate.

When the vehicle is standing still, the yaw rate assumes the value zero. However, in the case of a "detected" standstill (i.e. all wheels exhibit only a minimum yaw velocity), the vehicle may nevertheless skid. That is why the additional condition, that the yaw-rate sensor should measure only a small yaw rate, is necessary.

It should be noted again that, in this embodiment, the fuzzification of the input variables takes place in blocks 100, 101, 102 and 103. The arithmetic operations in the fuzzy region take place in blocks 120, 121, 130 and 131. The defuzzification is carried out in blocks 140 and 141.

What is claimed is:

1. A method for generating triggering signals for a passive safety device of a motor vehicle, comprising:
   determining, from signals, whether either an oversteering driving condition or an understeering driving condition exists;
   generating at least one triggering signal for a passive safety device as a function of the determined driving condition, wherein the at least one triggering signal is ascertained from the signals by a method based on fuzzy logic;
   ascertaining from sensor signals, whether a particularly strong or particularly quick driver's braking input is present;
   generating a first one of the triggering signals as a function of the ascertained driver's braking input using a method based on fuzzy logic, the first one of the triggering signals characterizing a dangerousness of a present driving condition from a standpoint of longitudinal dynamics; and
   generating a second one of the triggering signals depending on whether either an oversteering driving condition or an understeering driving condition exists, the second one of the triggering signals characterizing the dangerousness of an existing driving condition from a standpoint of lateral dynamics, wherein the second one of the triggering signals indicating the dangerousness of the existing driving condition from the standpoint of lateral dynamics is obtained by defuzzification, and wherein at least one variable which, in the case of an oversteering driving condition, is a measure for an intensity of the oversteering, and at least another variable which indicates whether or not an understeering is present, are used in the defuzzification.

2. The method as recited in claim 1, wherein the first one of the triggering signals and the second one of the triggering signals are binary signals which indicate whether or not a driving condition is dangerous, but which contain no information about a degree of dangerousness.

3. The method as recited in claim 1, wherein for ascertaining the dangerousness from the standpoint of lateral dynamics, a fuzzy deviation variable is determined by fuzzification of a variable describing a deviation of an actual vehicle handling from a setpoint vehicle handling, a steering-angle variable is ascertained, and the second triggering signal characterizing the dangerousness of the existing driving condition from the standpoint of lateral dynamics is ascertained by defuzzification from at least the steering-angle variable and the fuzzy deviation variable.

4. The method as recited in claim 1, wherein the first one of the triggering signals indicating the dangerousness of the present driving condition from the standpoint of longitudinal dynamics is obtained by defuzzification.

5. The method as recited in claim 4, further comprising:
   at least one of: i) determining a fuzzy braking-torque variable by fuzzification of a variable describing the intensity of the brake-pedal actuation, and ii) determining a fuzzy braking-speed variable by fuzzification of a variable describing a speed of a brake-pedal actuation;
   ascertaining a fuzzy longitudinal-dynamics variable characterizing the dangerousness of the existing driving condition from the standpoint of longitudinal dynamics from at least one of the fuzzy braking-torque variable and the fuzzy braking-speed variable; and
   ascertaining the first one of the triggering signals indicating the dangerousness of the existing driving condition from the standpoint of longitudinal dynamics by defuzzification of the fuzzy longitudinal-dynamics variable.

6. The method as recited in claim 1, wherein as a function of the at least one triggering signal, at least one of the following is performed:
  a closing of a vehicle sunroof is initiated,
  a closing of a vehicle side window is initiated,
  a driver's seat is brought into a predetermined position, and
  at least one seat-belt tightener is activated.

7. A device for generating triggering signals for a passive safety device of a motor vehicle, comprising:
  a driving-condition detection arrangement, which determines, from signals, whether either an oversteering driving condition or an understeering driving condition exists, and whether a particularly strong or particularly quick driver's braking input is present;
  a triggering-signal ascertainment arrangement, which generates at least one triggering signal for a passive safety device as a function of the ascertained driving condition, wherein the triggering-signal ascertainment arrangement is configured so that the at least one triggering signal is ascertained from the signals by a method based on fuzzy logic, wherein a first one of the triggering signals is generated as a function of the ascertained driver's braking input using a method based on fuzzy logic, the first one of the triggering signals characterizing a dangerousness of a present driving condition from a standpoint of longitudinal dynamics, and wherein a second one of the triggering signals is generated depending on whether either an oversteering driving condition or an understeering driving condition exists, the second one of the triggering signals characterizing the dangerousness of an existing driving condition from a standpoint of lateral dynamics, and the second one of the triggering signals indicating the dangerousness of the existing driving condition from the standpoint of lateral dynamics is obtained by defuzzification, and wherein at least one variable which, in the case of an oversteering driving condition, is a measure for an intensity of the oversteering, and at least another variable which indicates whether or not an understeering is present, are used in the defuzzification.

* * * * *